(12) United States Patent
Ghouse et al.

(10) Patent No.: US 12,220,956 B2
(45) Date of Patent: Feb. 11, 2025

(54) SIDEWALL SUITABLE FOR A GANGWAY AND GANGWAY

(71) Applicant: Dellner Couplers AB, Falun (SE)

(72) Inventors: Mohammed Ghouse, Kanchipuram (IN); Sowthri Ganth Selvakumar, Erode (IN); Uwe Lauschke, Magdeburg (DE)

(73) Assignee: Dellner Couplers AB, Falun (SE)

( * ) Notice: Subject to any disclaimer, the term of this patent is extended or adjusted under 35 U.S.C. 154(b) by 359 days.

(21) Appl. No.: 17/858,893

(22) Filed: Jul. 6, 2022

(65) Prior Publication Data

US 2023/0061809 A1 Mar. 2, 2023

(30) Foreign Application Priority Data

Jul. 7, 2021 (EP) ...................................... 21184259

(51) Int. Cl.
 B60D 5/00 (2006.01)
(52) U.S. Cl.
 CPC ...................... B60D 5/00 (2013.01)
(58) Field of Classification Search
 CPC .................................. B60D 5/00; B61D 17/20
 See application file for complete search history.

(56) References Cited

U.S. PATENT DOCUMENTS 8,523,261 B2 * 9/2013 Hubner .................. B61D 17/22
296/39.1

FOREIGN PATENT DOCUMENTS

| DE | 102017102525 A1 | * | 8/2018 | ............. B60D 5/003 |
|---|---|---|---|---|
| EP | 0597149 B1 | | 9/1996 | |
| EP | 2565098 A1 | | 3/2013 | |
| EP | 2998135 B1 | | 12/2017 | |
| EP | 3466730 B1 | | 12/2020 | |

* cited by examiner

*Primary Examiner* — Kevin Hurley
*Assistant Examiner* — Hosam Shabara
(74) *Attorney, Agent, or Firm* — Howard IP Law Group; Edward J. Howard (57) ABSTRACT

A sidewall suitable for a gangway comprises a first panel that provides a first gangway end; a second panel that provides a second gangway end, the second gangway end being opposite the first gangway end; a retractable rail comprising a first rail end that is connected to the first panel and that has a second rail end opposite the first rail end, wherein the second rail end is connected to the second panel, wherein the retractable rail extends along a longitudinal axis; and wherein a cover is attached to the rail and extending along the rail, the cover having a flexible portion that extends from the rail into a direction perpendicular to the longitudinal axis.

14 Claims, 10 Drawing Sheets

SIDEWALL SUITABLE FOR A GANGWAY AND GANGWAY

FIELD OF THE INVENTION

The invention pertains to a sidewall for gangway. The invention also pertains to a gangway. The invention also pertains to a multi-car vehicle with a first car and a second car.

BACKGROUND

Gangways with two facing the sidewalls, a floor and a ceiling are known in many different designs. Such a gangway is, for example, known from EP 2 565 098 A1. FIG. 2 of EP 2 565 098 A1 shows a flexible sidewall with the reference sign 1. At the top and at the bottom of the flexible sidewall additional one-piece covers are provided to cover a gap between the bottom edge and the top edge of the flexible sidewall and the floor and the ceiling respectively. By way of the holding element 10 EP 2 565 098 A1 shows an element for mounting the gangway to the end of a car.

The design known from EP 2 565 098 A1 as regards the coverage of a gap between the bottom edge of the sidewall and the floor or the top edge of a sidewall and the ceiling leaves room for improvement. In the design of EP 2 565 098 A1 gaps can occur in certain driving conditions.

SUMMARY

The problem to be solved by the invention is to provide a sidewall for a gangway that reduces the occurrence of gaps between the bottom edge of the sidewall and the floor or the top edge of the sidewall and the ceiling even further.

This problem is solved by one or more of a sidewall, gangway and multi-car vehicle according to embodiments and aspects of the present disclosure. Preferred embodiments are discussed in the description following hereafter.

Embodiments or aspects of the invention work with the basic idea to provide a cover that by way of being attached to a rail and the attachment of the rail to the gangway ends is indirectly connected to the gangway ends. The positioning of the cover within the gangway hence is dependent on the positioning of the gangway ends. The invention works on the basic understanding that the positioning of the floor and the positioning of the ceiling in a gangway is at least to a certain extent linked to the position of the first gangway end relative to the second gangway end. By way of the rail that is attached to the first gangway end and the second gangway end and by way of attaching the cover to the rail, the invention makes the cover follow the movement of the gangway ends and their relative position to each other. Given that the invention works on the understanding that the ceiling and the floor also at least to a certain extend follow the movement of the first gangway end and the second gangway end, the design according to embodiments or aspects the invention at least to a certain extend synchronizes the movement of the cover to the movement of the floor and/or the ceiling, and hence reduces the occurrence of gaps that in the prior art may occur due to a misalignment of a cover with the floor and/or the ceiling.

Embodiments or aspects of the invention provide a sidewall, gangway and multi-car vehicle. Aspects of the invention are described, each of which may be independent and patentable on its own. In addition, several or all of the aspects can be combined.

The respective sidewall has a first gangway end and a second gangway end, the second gangway end being opposite the first gangway end. The sidewall can be a flexible sidewall of the type disclosed in EP 2 565 098 A1. In a preferred embodiment, the sidewall has a first panel that provides the first gangway end and has a second panel that provide the second gangway end. In a preferred embodiment, the first panel is moveable relative to the second panel. In a preferred embodiment, the sidewall has an operational condition in which the first panel and the second panel are arranged parallel to each other. In a preferred embodiment, the sidewall has a height direction. In a preferred the first panel has a height direction and the second panel has a height direction. In a preferred embodiment, the sidewall has an operational condition in which the height direction of first panel is parallel to the height direction of the second panel and preferably is parallel to the height direction of the sidewall.

In a preferred embodiment the first panel has a height, the height being understood as the maximum extend of the first panel into the height direction. In a preferred embodiment, the first panel has a width, the width being understood as the maximum extend of the first panel into a width direction, the width direction being perpendicular to the height direction. In a preferred embodiment, the first panel has a thickness, the thickness being understood as the maximum extend of the first panel into a thickness direction, the thickness direction being perpendicular to the height direction and perpendicular to the width direction.

In a preferred embodiment the height of the first panel is larger than the width of the first panel, preferably by factor of more than 1.2, more preferably by a factor of more than 1.5, more preferably by a factor of more than 2. In a preferred embodiment the width of the first panel is larger than the thickness of the first panel, preferably by factor of more than 2, more preferably by a factor of more than 5, more preferably by a factor of more than 10. In a preferred embodiment the height of the first panel is larger than the width of the first panel, whereby the width is larger than the thickness of the first panel.

In a preferred embodiment the first panel is a rectangular body. In a preferred embodiment, the height of the rectangular body is between 0.5 meter (m) and 4 m, preferably between 1.0 m and 3.5 m, preferably between 1.5 m and 3.0 m. In a preferred embodiment, the width of the rectangular body is between 0.1 m and 2.5 m, preferably between 0.2 m and 2 m, preferably between 0.3 m and 2.0 m. In a preferred embodiment, the thickness of the rectangular body is between 1 millimeter (mm) and 50 mm, preferably between 2 mm and 30 mm, preferably between 3 mm and 20 mm.

In a preferred embodiment the first gangway end is arranged at an end of the first panel that extends into the height direction.

In a preferred embodiment the second panel has a height, the height being understood as the maximum extend of the second panel into the height direction. In a preferred embodiment, the second panel has a width, the width being understood as the maximum extend of the second panel into a width direction, the width direction being perpendicular to the height direction. In a preferred embodiment, the second panel has a thickness, the thickness being understood as the maximum extend of the second panel into a thickness direction, the thickness direction being perpendicular to the height direction and perpendicular to the width direction.

In a preferred embodiment the height of the second panel is larger than the width of the second panel, preferably by a factor of more than 1.2, more preferably by a factor of more than 1.5, more preferably by a factor of more than 2. In a preferred embodiment the width of the second panel is larger than the thickness of the second panel, preferably by a factor of more than 2, more preferably by a factor of more than 5, more preferably by a factor of more than 10. In a preferred embodiment the height of the second panel is larger than the width of the second panel, whereby the width is larger than the thickness of the second panel.

In a preferred embodiment the second panel is a rectangular body. In a preferred embodiment, the height of the rectangular boy is between 0.5 m and 4 m, preferably between 1.0 m and 3.5 m, preferably between 1.5 m and 3.0 m. In a preferred embodiment, the width of the rectangular body is between 0.1 m and 2.5 m, preferably between 0.2 m and 2 m, preferably between 0.3 m and 2.0 m. In a preferred embodiment, the thickness of the rectangular body is between 1 mm and 50 mm, preferably between 2 mm and 30 mm, preferably between 3 mm and 20 mm.

In a preferred embodiment the second gangway end is arranged at an end of the second panel that extends into the height direction.

In a preferred embodiment, the first panel and the second panel have the same shape and/or size. In a preferred embodiment, the first panel and the second panel are designed mirror-symmetrical about a plane that is perpendicular to the sidewall and contains the height direction of the sidewall.

In a preferred embodiment a center panel is provided. In a preferred embodiment, the center panel is provided between the first panel and the second panel. In a preferred embodiment, the sidewall only contains the first panel, the second panel and the center panel but no further panel of the size of the first panel.

In a preferred embodiment, the center panel has a height, the height being understood as the maximum extend of the center panel into the height direction. In a preferred embodiment, the center panel has a width, the width being understood as the maximum extend of the center panel into a width direction, the width direction being perpendicular to the height direction. In a preferred embodiment, the center panel has a thickness, the thickness being understood as the maximum extend of the center panel into a thickness direction, the thickness direction being perpendicular to the height direction and perpendicular to the width direction.

In a preferred embodiment the height of the center panel is larger than the width of the center panel, preferably by a factor of more than 1.2, more preferably by a factor of more than 1.5, more preferably by a factor of more than 2. In a preferred embodiment the width of the center panel is larger than the thickness of the second panel, preferably by a factor of more than 2, more preferably by a factor of more than 5, more preferably by a factor of more than 10. In a preferred embodiment the height of the center panel is larger than the width of the center panel, whereby the width is larger than the thickness of the center panel.

In a preferred embodiment the center panel is a rectangular body. In a preferred embodiment, the height of the rectangular boy is between 0.5 m and 4 m, preferably between 1.0 m and 3.5 m, preferably between 1.5 m and 3.0 m. In a preferred embodiment, the width of the rectangular body is between 0.1 m and 2.5 m, preferably between 0.2 m and 2 m, preferably between 0.3 m and 2.0 m. In a preferred embodiment, the thickness of the rectangular body is between 1 mm and 50 mm, preferably between 2 mm and 30 mm, preferably between 3 mm and 20 mm.

In a preferred embodiment the first panel and the second panel are made from the same material. In a preferred embodiment the first panel and the second panel and the third panel are made from the same material. In a preferred embodiment the first panel and the second panel are made from the same material, but the third panel is made from a different material.

In a preferred embodiment, the sidewall according to the invention has a first vehicle mounting plate. The first vehicle mounting plate is the item of the gangway that is intended for attaching the gangway to an end of a vehicle with the first vehicle mounting plate. The first vehicle mounting plate hence preferably has means for connecting the gangway to the end of the vehicle, for example hooks or for example holes for placing bolts there through. The first vehicle mounting plate for example looks like the items indicated with the reference sign 10 in FIGS. 2, 3, 4 and 5 of EP 2 565 098 A1. In a preferred embodiment, the first vehicle mounting plate is part of a frame, especially preferred a ring shaped frame, for example a square ring of four longitudinal bars attached to each other at angles of 90°. The first vehicle mounting plate can also be part of an inverted u-shaped frame, the legs of the u being the first vehicle mounting plates of facing sidewalls of the gangway respectively and the connecting bar of the u being located close to the ceiling or forming part of the ceiling.

In a preferred embodiment the sidewall according to the invention has a second vehicle mounting plate. The second vehicle mounting plate is the item of the gangway that is intended for attaching the gangway to an end of a vehicle with the second vehicle mounting plate. The second vehicle mounting plate hence preferably has means for connecting the gangway to the end of the vehicle, for example hooks or for example holes for placing bolts there through. The second vehicle mounting plate for example looks like the items indicated with the reference sign 10 in FIGS. 2, 3, 4 and 5 of EP 2 565 098 A1. In a preferred embodiment, the second vehicle mounting plate is part of a frame, especially preferred a ring shaped frame, for example a square ring of four longitudinal bars attached to each other at angles of 90°. The second vehicle mounting plate can also be part of an inverted u-shaped frame, the legs of the u being the second vehicle mounting plates of facing sidewalls of the gangway respectively and the connecting bar of the u being located close to the ceiling or forming part of the ceiling.

According to an aspect of the invention the sidewall has a retractable rail. The retractable rail has a first rail end that is connected to the first gangway end and has a second rail end opposite the first rail end, which second rail end is connected to the second gangway end. The retractable rail extends along a longitudinal axis. The term "retractable rail" refers to a rod-type element, which is designed in such a manner that the first rail end and the second rail end can be moved towards each other or away from each other along the longitudinal axis, while the retractable rail is preferably stiff against bending around any axis that runs perpendicular to the longitudinal axis. In a preferred embodiment, the retractable rail is a telescopic rod. In a further embodiment the retractable rail is an element that consists of two telescopic rods that are connected to each other at their ends or have a joint center rod. In a preferred embodiment, the two telescopic rods have a joint center rod, one end of the center rod being arranged within a first end tube to create the one telescopic rod, the opposite end of the center rod being arranged within a second end tube to create the second telescopic rod. Preferably the first end tube is connected to the first gangway end and the second end tube is connected to the second gangway end.

In a preferred embodiment the first end tube has an open end into which the one end of the center rod is arranged. In a preferred embodiment a nylon bush is arranged at the open end, the nylon bush being arranged around the center rod and extending inwards into the first end tube from the open end. In a preferred embodiment, a rubber bush is arranged around the nylon bush, which rubber bush preferably extends inwards into the first end tube from the open end and preferably extends inwards into the first end tube from the open end by the same or a lesser amount than the nylon bush. In a preferred embodiment the second end tube has an open end into which the opposite end of the center rod is arranged. In a preferred embodiment a nylon bush is arranged at the open end, the nylon bush being arranged around the center rod and extending inwards into the second end tube from the open end. In a preferred embodiment, a rubber bush is arranged around the nylon bush, which rubber bush preferably extends inwards into the second end tube from the open end and preferably extends inwards into the second end tube from the open end by the same or a lesser amount than the nylon bush.

In a preferred embodiment the retractable rail is designed mirror symmetrical about a plane that is arranged perpendicular to the longitudinal axis. In a preferred embodiment the retractable rail is designed mirror symmetrical about a plane that is arranged perpendicular to the longitudinal axis as regards the design of a center rod and the design of a first end tube and a second end tube. In a preferred embodiment the retractable rail is designed mirror symmetrical about a plane that is arranged perpendicular to the longitudinal axis as regards the design of a center rod and the design of a first end tube and a second end tube, but designed differently as regards the attachment of the first end tube to the first gangway end compared to the attachment of the second end tube to the second gangway end.

The term "connected to the first gangway end" is to be understood as a connection of the first rail end to the element that provides the first gangway end, for example the first panel, in an end zone of the element, the endzone being smaller than a half of the width of the element that provides the first gangway end. In the context of the embodiment where the first panel provides the first gangway end, the term "connected to the first gangway end" is to be understood to encompass a connection of the first rail end to the first panel in an endzone of the first panel, the endzone being smaller than a half of the width of the first panel, preferably smaller than a third of the width of the panel. The term "connected to the first gangway end" is to be also understood to encompass a connection of the first rail end to a defined end piece of the sidewall, like for example a vehicle mounting plate.

The term "connected to the second gangway end" is to be understood as a connection of the second rail end to the element that provides the second gangway end, for example the second panel, in an end zone of the element, the endzone being smaller than a half of the width of the element that provides the second gangway end. In the context of the embodiment where the second panel provides the second gangway end, the term "connected to the second gangway end" is to be understood to encompass a connection of the second rail end to the second panel in an endzone of the second panel, the endzone being smaller than a half of the width of the second panel, preferably smaller than a third of the width of the panel. The term "connected to the second gangway end" is to be also understood to encompass a connection of the second rail end to a defined end piece of the sidewall, like for example a vehicle mounting plate.

According to an aspect of the invention, the sidewall has a cover that is attached to the rail and extends along the rail. The cover has a flexible portion that extends from the rail into a direction perpendicular to the longitudinal axis.

Because the rail is attached to the first gangway end and the second gangway end, the orientation of the rail in space is dependent on the position of the first gangway end and the second gangway end in space. Hence, if in a certain driving condition, the first gangway end moves upwards in the vertical direction relative to the second gangway end, the first rail end will also be moved vertically upwards relative to the second rail end. In the same manner, the rail will follow a movement of the first gangway end downwards in relation to the second gangway end or any movement of the first gangway end sideways relative to the second gangway end. Because the cover is attached to the rail, the cover will follow these movements, too. The flexible portion of the cover allows the cover to flex, for example bend inwards or bend outwards in those places, where the flexible portion is. This allows the cover to adapt for driving situations, where a part of the floor or a part of the ceiling comes closer to the rail than in other driving condition.

In a preferred embodiment the first rail end is connected with the first gangway end by way of a joint that allows swivel movement of the rail relative to the first gangway end. In a preferred embodiment, the first rail end, preferably the first end tube of a telescopic rail is attached to the first panel by way of a joint. In a preferred embodiment the second rail end is connected with the second gangway end by way of a joint that allows swivel movement of the rail relative to the second gangway end. In a preferred embodiment, the second rail end, preferably the second end tube of a telescopic rail is attached to the second panel by way of a joint. In a preferred embodiment the second rail end is connected with the second gangway end by way of a joint that additionally allows for a limited linear movement of the second rail end relative to the second gangway end. Preferably the direction of the limited linear movement is in the height direction. Preferably the direction of the limited linear movement is in the height direction and the thickness direction. In a preferred embodiment, the second rail end, preferably the second end tube of a telescopic rail is attached to the second panel by way of a joint that has an end that is arranged in a linear groove or linear slot, whereby the end can move within the linear groove or slot thereby allowing a limited linear movement to the extent of the length of the groove or slot.

A joint can be generally be provided by a pin arranged on one element (for example the rail) that engages into a hole arranged on the other element, for example the panel or an element attached to the panel like a block. A joint can be provided that allows for or enables swivel movements only in one rotational direction. A joint can, however, also be provided that allows for swivel movements in several rotational directions, for example like a knee joint.

In a preferred embodiment the sidewall has a center panel and the rail is connected to the center panel. In a preferred embodiment the rail is connected to the center panel by way of a joint.

In a preferred embodiment the cover has a first cover end that is connected to the first vehicle mounting plate and/or that has a second cover end opposite the first cover end, which second cover end is connected to the second vehicle mounting plate. Connecting the cover to the first vehicle mounting plate and/or the second vehicle mounting plate allows to secure the position of the cover relative to the rail.

In a preferred embodiment the cover has at least one hole and that the rail passes through the hole. This allows the cover to be held on the rail. Alternatively, clips might be provided on the cover that allow the cover to be attached to the rail.

In a preferred embodiment the flexible portion contains a series of fringes that are arranged next to each other and that extend into a direction perpendicular to the longitudinal axis. In a preferred embodiment the series of fringes extends along the complete length of the cover. In a preferred embodiment the cover is made from a piece of fabric, preferably from a piece of fabric made of layers of rubber and fabric material.

In a preferred embodiment, the cover is made up of a series of individual cover pieces. In a preferred embodiment the majority, preferably the overwhelming majority (more than 75%) and more preferably all cover pieces are block-shaped pieces. In a preferred embodiment, the cover is made up of a series of individual cover pieces. In a preferred embodiment the majority, preferably the overwhelming majority (more than 75%) and more preferably all cover pieces have the same geometric shape and/or size.

In a preferred embodiment the majority, preferably the overwhelming majority (more than 75%) and more preferably all cover pieces are connected to the rail and extend from the rail into a direction perpendicular to the longitudinal axis. In a preferred embodiment the flexible portion of the cover is provided by that part of the majority, preferably the overwhelming majority (more than 75%) and more preferably all cover pieces that is arranged furthest away from the rail. In a preferred embodiment the cover pieces are designed to be more flexible in that part that is further away from the rail than that part of the respective cover piece that is attached to the rail. The difference in flexibility can be achieved by differences in shape of the respective parts of the respective cover piece and/or by differences in the material thickness of the respective parts of the respective cover piece.

The feature that the cover has a flexible portion that extends from the rail into a direction perpendicular to the longitudinal axis means that at least this portion of the cover is to be flexible. This does not exclude that further portions of the cover, for example portions attached to the rail are also flexible. Embodiments are feasible, where the cover as parts with different flexibility, in which embodiments the parts extending from the rail into a direction perpendicular to the longitudinal axis would be more flexible than those parts attached to the rail. In alternative embodiments the cover has a constant flexibility and has the same flexibility in those parts that extend from the rail into a direction perpendicular to the longitudinal axis and in the parts attached to the rail.

The flexibility of the cover can change along its extent along the longitudinal axis. For example, parts of the cover arranged closer to the gangway ends can be stiffer than parts in the middle of the cover. In an alternative, parts of the cover arranged closer to the gangway ends can be more flexible than parts in the middle of the cover.

In a preferred embodiment the majority, preferably the overwhelming majority (more than 75%) and more preferably all cover pieces have at least one hole, whereby the rail passes through the hole. Alternatively, clips might be provided on the respective cover piece that allow the respective cover piece to be attached to the rail.

In a preferred embodiment within the series of individual cover pieces at least a first sub-series of cover pieces with a first elasticity and a further sub-series of cover pieces with a second elasticity is provided. In a preferred embodiment within the series of individual cover pieces
    a first sub-series of cover pieces with a lower elasticity is provided closer to the first gangway end,
    a second sub-series of cover pieces with a lower elasticity, preferably the same elasticity than the elasticity of the cover pieces of the first sub-series, is provided closer to the second gangway end,
    and a third sub-series of cover pieces with a higher elasticity is provided, the cover pieces of the third sub-series being arranged between the cover pieces of the first sub-series and the cover pieces of the second sub-series.

In a preferred embodiment, the difference in elasticity of the cover pieces of the one sub-series relative to the cover pieces of the other sub-series is achieved by having the cover-pieces of the sub-series with the higher elasticity being at least partially hollow and the cover-pieces of the sub-series with the lower elasticity being solid or at least less hollow than the cover-pieces of the sub-series with the higher elasticity.

In a preferred embodiment cover pieces of the first sub-series with a first elasticity have the same shape and/or size than the cover pieces of the further sub-series of cover pieces with a second elasticity.

In a preferred embodiment the majority, preferably the overwhelming majority (more than 75%) and more preferably all cover pieces are rubber mould pieces.

In a preferred embodiment the majority, preferably the overwhelming majority (more than 75%) and more preferably all cover pieces extend away from the rail into the direction perpendicular to the longitudinal axis by the same amount.

According to an aspect of the invention, the gangway according to the invention has a sidewall according to the invention.

In a preferred embodiment, the gangway has two facing sidewalls, preferably two sidewalls according to the invention that face each other. A gangway according to the invention has a floor and a ceiling. The room between the two facing sidewalls, the floor and the ceiling is considered as the space that passengers can walk through. The sidewalls can be of any design known from the prior art.

The gangway might also have bellows arranged to the outside of the sidewalls and the ceiling and possibly also parts of the floor.

The floor can also be one solid plate attached to the vehicle mounting plates. However, in a more preferred embodiment, the floor is made up of several plates, whereby the one plate rests with one end on a neighboring plate. The floor can, for example, have a first tread plate that is attached to the first vehicle mounting plate, and a center plate that rests with one end on the first tread plate, and a further, second tread plate that is attached to the second vehicle mounting plate, whereby the center plate also rests with one end on the second tread plate. Other designs with more plates resting upon each other or being connected to one each other in a flexible manner are also feasible.

The ceiling can also be one solid plate attached to the vehicle mounting plates. However, in a more preferred embodiment, the ceiling is made up of several plates, whereby the one plate rests with one end on a neighboring plate. The ceiling can, for example, have a first plate that is attached to the first vehicle mounting plate, and a center plate that rests with one end on the first plate, and a further, second plate that is attached to the second vehicle mounting plate, whereby the center ceiling plate also rests with one end on the second plate. Other designs with more plates resting upon each other or being connected to one each other in a flexible manner are also feasible.

In a preferred embodiment, the gangway has a normal position, in which a floor of the gangway takes up a predetermined position and the sidewall takes up a predetermined position, whereby the sidewall has a bottom edge and whereby in the normal position the bottom edge is arranged at a predetermined position relative to the floor, whereby in that normal position a gap exists between the bottom edge and the floor, whereby in the normal position, the rail is arranged above the bottom edge and the flexible portion of the cover extends towards the floor and at least partially covers the gap.

In a preferred embodiment, the gangway has a normal position, in which a floor of the gangway takes up a predetermined position and the sidewall takes up a predetermined position, whereby the sidewall has a top edge and whereby in the normal position the top edge is arranged at a predetermined position relative to the ceiling, whereby in that normal position a gap exists between the top edge and the ceiling, whereby in the normal position, the rail is arranged below the top edge and the flexible portion of the cover extends towards the ceiling and at least partially covers the gap.

In a preferred embodiment, the flexible portion of the cover is in contact with a part of the floor or a part of the ceiling respectively in the normal position. In a preferred embodiment, the tips of the fringes are bend inwards or outwards in the normal position and the flexible portion is in contact with a part of the floor or a part of the ceiling respectively with a portion of the flexible portion that is distanced from the tip of the fringes.

In a preferred embodiment in the normal position a central plate of a floor or a ceiling respectively is orientated horizontally.

In a preferred embodiment, the retractable rail and the cover is arranged on one side of the sidewall, preferably the side that the passengers pass by the sidewall. In a preferred embodiment, the retractable rail and the cover is arranged on one side of the sidewall, preferably the side that the passengers pass by the sidewall, and at least one further telescopic rod is arranged on the opposite side of the sidewall, the further telescopic rod also being attached to the first gangway end and the second gangway end.

The multi-car vehicle according to an aspect of the invention has a first car and a second car, whereby the first car has an end and whereby the second car has an end, whereby a gangway according to the invention is arranged between the first car and the second car. Preferably the first vehicle mounting plate is attached to the end of the first car and the second vehicle mounting plate is attached to the second car.

BRIEF DESCRIPTION OF THE DRAWINGS

In the following the invention will be described with reference to Figures that only show embodiments of the invention.

DETAILED DESCRIPTION

Figure 1:
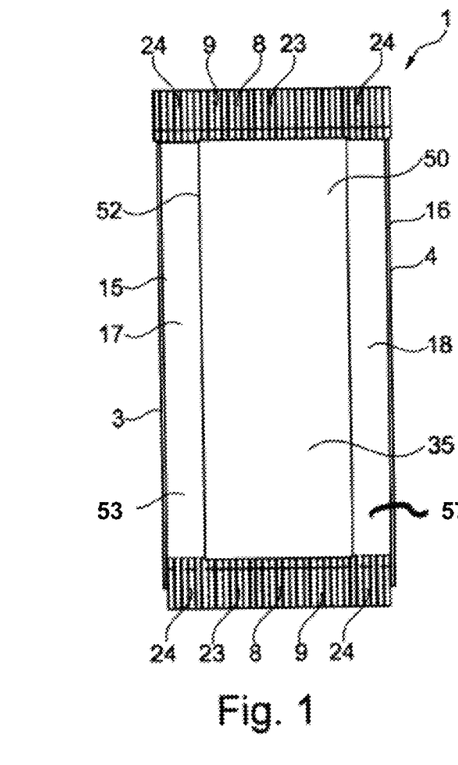
FIG. 1 shows a schematic view onto the front of a sidewall according to an embodiment of the invention.
Figure 2:
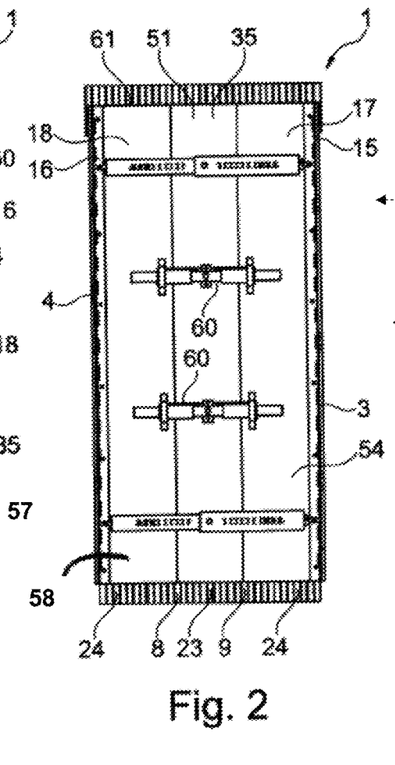
FIG. 2 shows a schematic view onto the back of a sidewall according to FIG. 1.
Figure 3:
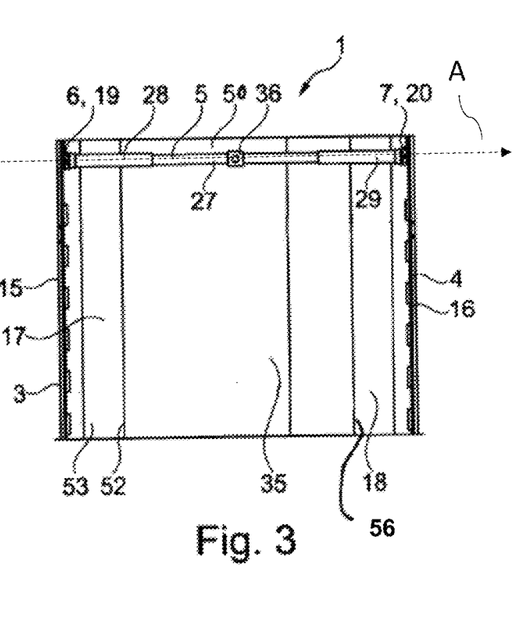
FIG. 3 shows a schematic view onto the top part of the front of a sidewall according to FIG. 1 with the cover pieces that make up the cover having been removed to show the design of the rod.
Figure 4:
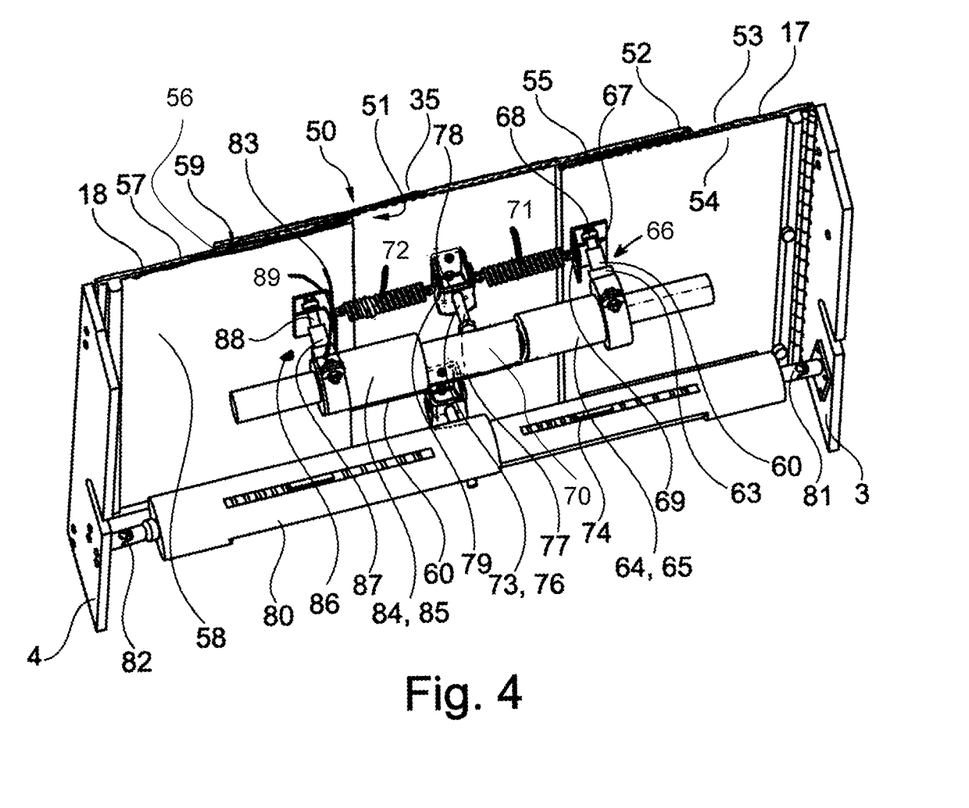
FIG. 4 shows a schematic, partially sectional perspective view onto the back of the sidewall according to FIG. 1
Figure 5:
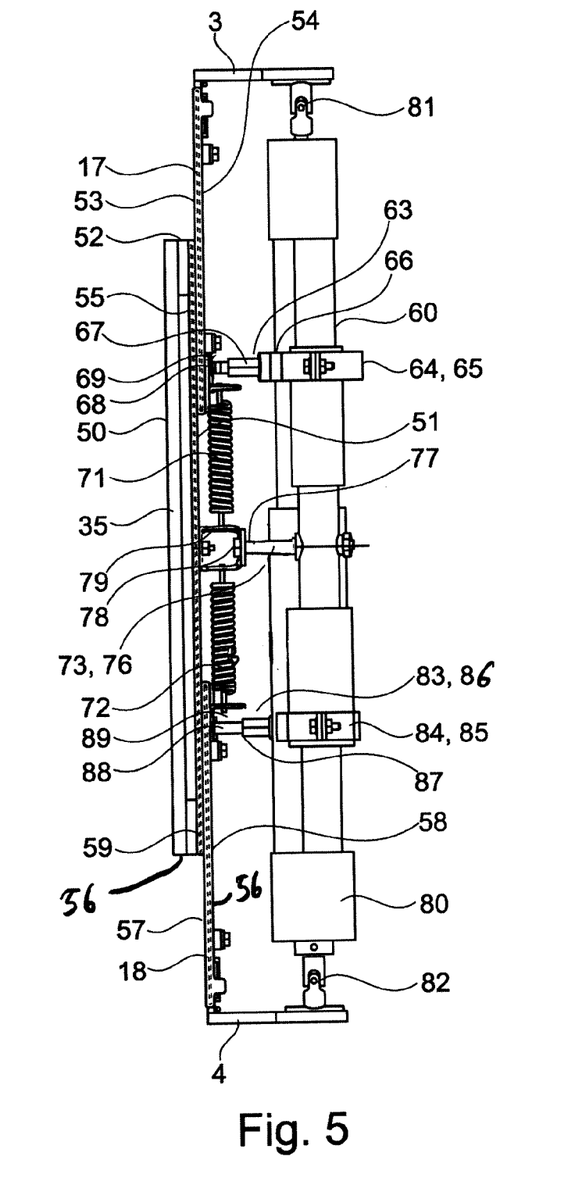
FIG. 5 shows a top view onto the sidewall according to FIG. 1 without a rod or a cover.

FIG. 1 shows a part of a sidewall 1 and the floor 2 of a gangway, which gangway has two facing sidewalls, a floor 2 and a ceiling (not shown). The gangway has a first vehicle mounting plate 3 arranged at a first gangway end 15, the first vehicle mounting plate 3 being suitable to attach the gangway to an end of a vehicle and a second vehicle mounting plate 4 arranged at a second gangway end 16, said second gangway end 16 being opposite the first gangway end 15, the second vehicle mounting plate 4 being suitable to attach the gangway to an end of a vehicle.

In FIG. 1 the first vehicle mounting plate 3 and the second vehicle mounting plate 4 each are shown as a vertical bar. The respective vertical bar can be a stand-alone bar with further, separate bars possibly being arranged at the first gangway end and/or the second gang way end respectively in the region of the ceiling and/or the region of the facing sidewall. In an alternative embodiment, the respective vertical bar shown in FIG. 1 can be part of a frame shaped structure, for example a u-shaped structure or a rectangular frame, which serve as interface between the gangway and the respective end of the vehicle.

The sidewall 1 comprises a central main panel (35) having a front side 50 and a back side 51. A first side panel 17 is arranged to partially extend from a first side 52 of the central main panel 35, the first side panel 17 having a front side 53 and a back side 54, a part 55 of the front side 53 of the first side panel 17 being arranged facing the back side 51 of the central main panel 35. A second side panel 18 is arranged to partially extend from a second side 56 of the central main panel 35, opposite to the first side 52 of the central main panel 35, the second side panel 18 having a front side 57 and a back side 58, a part 59 of the front side 57 of the second side panel 18 being arranged facing the back side 51 of the central main panel 35.

Two connection rods 60 are provided, one arranged above the other in the direction of the height of the sidewall. The respective upper connection rod 60 being arranged closer to the middle of the sidewall 1 in the height direction than towards a top end 61 of the sidewall 1. The respective lower connection rod 60 being arranged closer to the middle of the sidewall 1 in the height direction than towards a bottom end 62 of the sidewall 1.

A first connection 63 is provided that connects the connection rod 60 to the back side 54 of the first side panel 17. The first connection 63 comprises a linear guide 64 provided by a bush 65 and a joint 66, the joint being provided by a pin 67 attached to the bush 65, an end 68 of the pin 67 being arranged in a hole of a block 69. The block 69 is attached to the back side 54 of the first side panel 17. The pin 67 is allowed to rotate inside the block 69, thereby allowing the connection rod 60 to rotate relative to the back side 54 of the first side panel 17.

A second connection 73 is provided that connects the connection rod 60 to the back side 51 of the central main panel 35. The second connection 73 comprises a joint 76, the joint 76 being provided by a pin 77 attached to a central rod 70, an end 78 of the pin 77 being arranged in a hole of a block 79. The block 79 is attached to the back side 51 of the central main panel 35. The pin 77 is allowed to rotate inside the block 79, thereby allowing the connection rod 60 to rotate relative to the back side 51 of the central main panel 35.

A third connection 83 is provided that connects the connection rod 60 to the back side 58 of the second side panel 18. The third connection 83 comprises a linear guide 84 provided by a bush 85 and a joint 86, the joint being provided by a pin 87 attached to the bush 85, an end 88 of the pin 87 being arranged in a hole of a block 89. The block 89 is attached to the back side 58 of the second side panel 18. The pin 87 is allowed to rotate inside the block 89, thereby allowing the connection rod 60 to rotate relative to the back side 58 of the second side panel 18.

The central rod 70 is arranged to extend through the bush 65 and the bush 85. The bush 65 defines a linear direction that is parallel to the width direction of the sidewall 1. The bush 85 defines a linear direction that is parallel to the width direction of the sidewall 1.

A coil spring 71 is arranged between the block 69 and the block 79. A further coil spring 72 is arranged between the block 79 and the block 89.

Two telescopic rods 80 are provided. The first vehicle mounting plate 3 is provided at one side of the first side panel 17 and the second vehicle mounting plate 4 is provided at one side of the second side panel 18. Each of the two telescopic rods 80 connects the first vehicle mounting plate 3 to the second vehicle mounting plate 4. The upper telescopic rod 80 is arranged closer to the top end 61 than the upper connection rod 60. The lower telescopic rod 80 is arranged closer to the bottom end 62 than the lower connection rod 60.

The respective telescopic rod 80 is connected to the first vehicle mounting plate 3 by means of a cardan joint 81. The respective telescopic rod 80 is connected to the second vehicle mounting plate 4 by means of a cardan joint 82.

A coil spring 74 is arranged inside the telescopic rod 80 and pre-tensions the telescopic rod 80 and hence the first vehicle mounting plate 3 and the second vehicle mounting plate 4 into a predetermined position. If the ends of the telescopic rod 80 are moved closer together, which means that the first vehicle mounting plate 3 and the second vehicle mounting plate 4 at those points, where they are connected to the telescopic rod 80, come closer together, the coil spring 74 is compressed and attempts by way of expanding to move the ends of the telescopic rod 80 further apart (e.g. to return to a predetermined position). If the ends of the telescopic rod 80 are moved further apart, which means that the first vehicle mounting plate 3 and the second vehicle mounting plate 4 at those points, where they are connected to the telescopic rod 80, come further apart, the coil spring 74 is expanded and attempts by way of coming back together to move the ends of the telescopic rod 80 closer together (e.g. to return to a predetermined position).

The gangway has a retractable rail 5 that has a first rail end 6 that is connected to a first side panel 17 and that has a second rail end 7 opposite the first rail end 6, which second rail end 7 is connected to a second side panel 18. The retractable rail 5 extends along a longitudinal axis A.

As shown in FIG. 1, 2, 10, 12 a cover 8 is provided. The cover 8 is attached to the rail 5 and extends along the rail 5. The cover 8 has a flexible portion 9 that extends from the rail 5 into a direction perpendicular to the longitudinal axis A.

As can be seen from FIG. 3, 6, 7, 8, 9 the retractable rail 5 is a telescopic rod.

Figure 6:
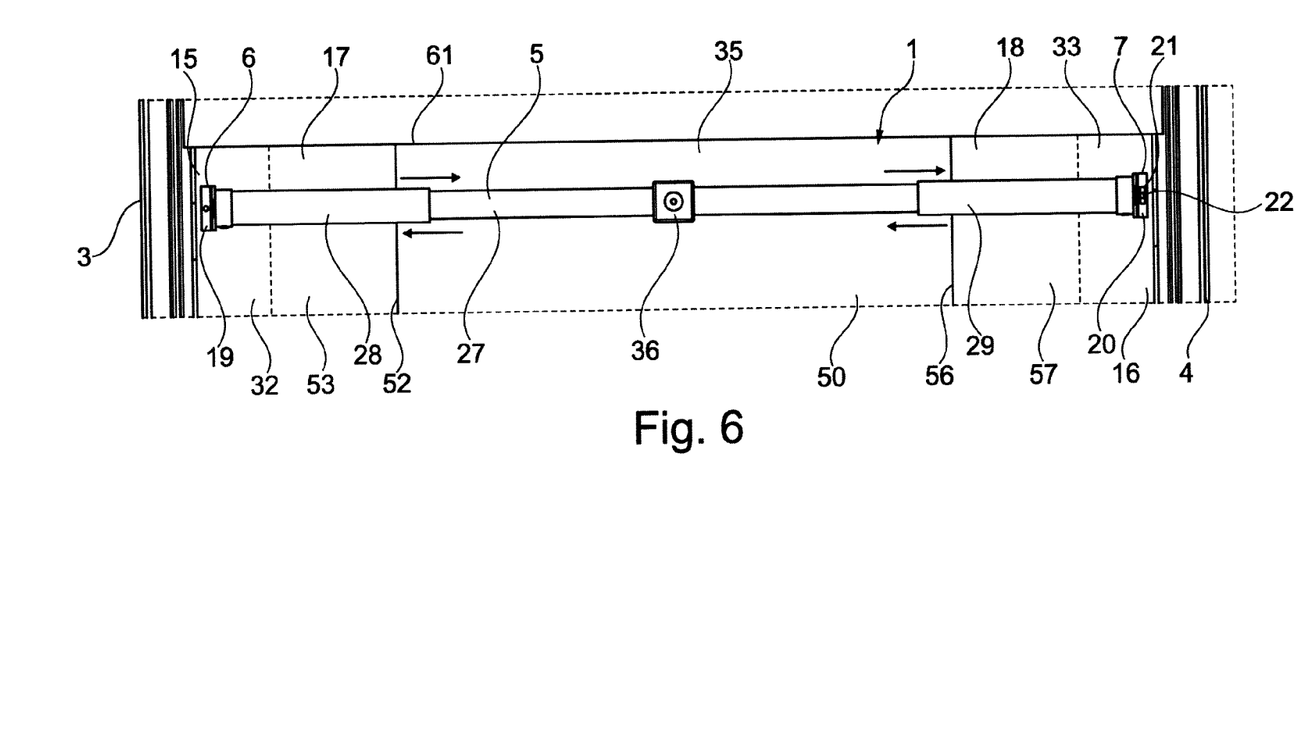
FIG. 6 shows a close-up schematic view onto the rod shown in FIG. 3.
Figures 7, 8:
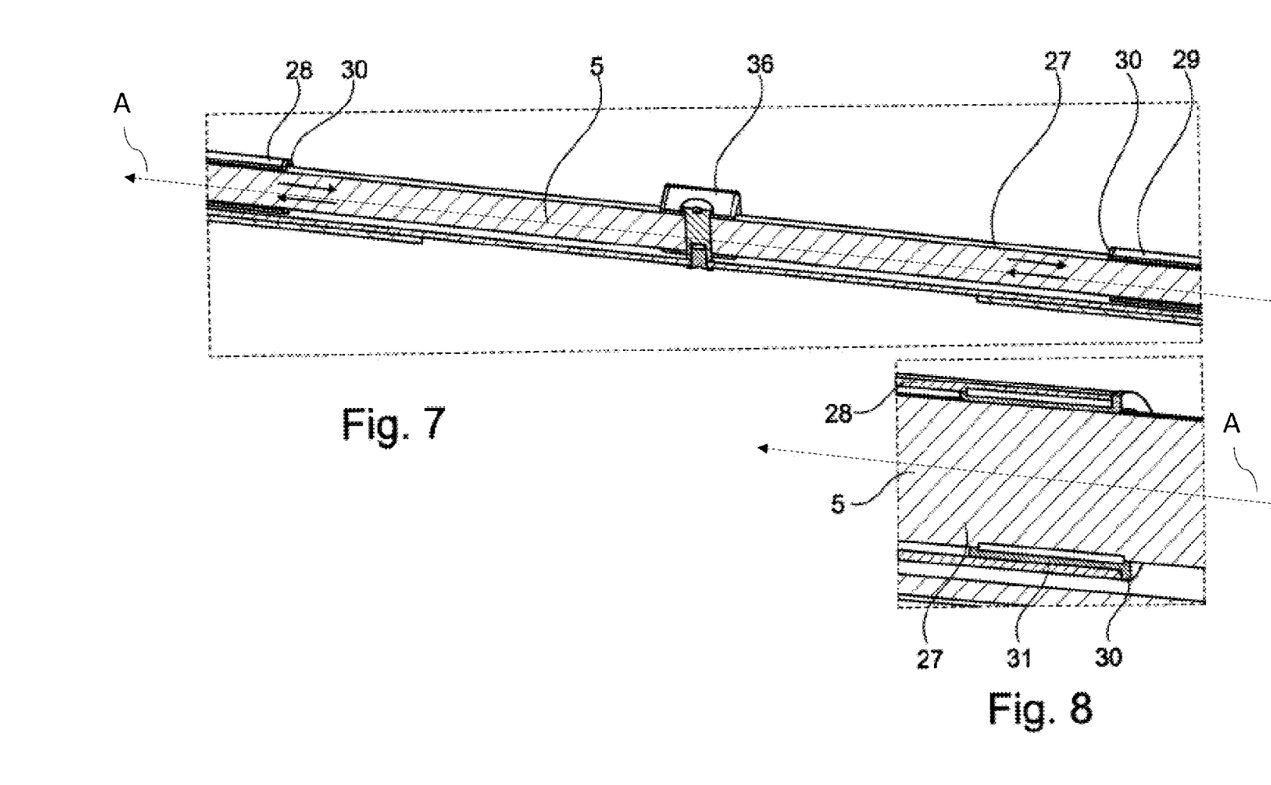
FIG. 7 shows a schematic sectional view of the rod according to FIG. 3.
FIG. 8 shows a schematic sectional view of a detail of the rod of FIG. 7.
Figure 9:
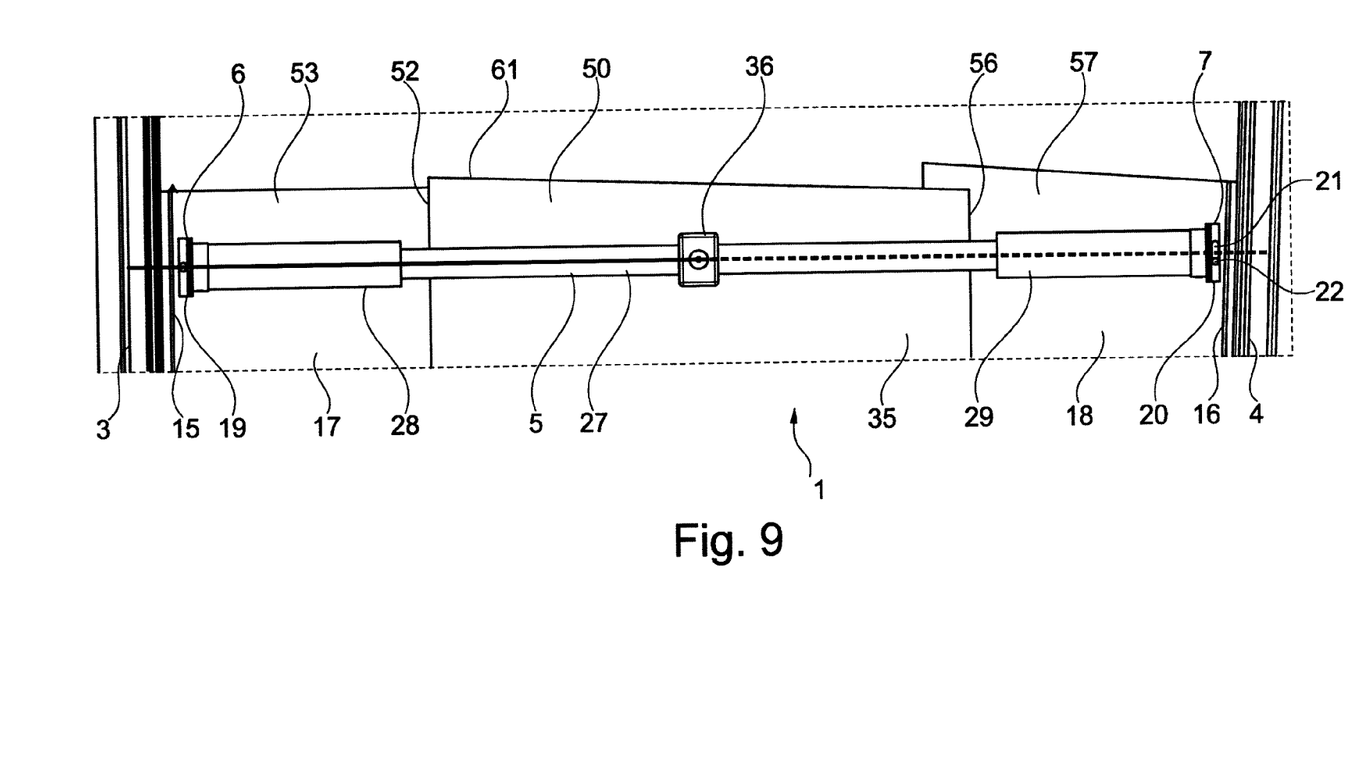
FIG. 9 shows the view of FIG. 6 with the panels of the sidewall arranged in a different condition.

As can be seen from FIGS. 6 and 9 the first rail end 6 is connected to the first side panel 17 by way of a joint 19 that allows swivel movement of the rail 5 relative to the first side panel 17 and the second rail end 7 is connected to the second side panel 18 by way of a joint 20 that allows swivel movement of the rail 5 relative to the second side panel 18. As can be seen, the joint 20 has a slot 21 and a pin 22 arranged in the slot 21. This arrangement allows a limited linear movement of the second rail end 7 relative to the second side panel 18 in the height direction (the direction upwards in FIG. 9), namely limited by the length of the slot 21.

The retractable rail 5 is an element that consists of two telescopic rods that have a joint center rod 27. One end of the center rod 27 is arranged within a first end tube 28 to create one telescopic rod, the opposite end of the center rod 27 is arranged within a second end tube 29 to create the second telescopic rod. The first end tube 28 is connected to the first gangway end 15 and the second end tube 29 is connected to the second gangway end 16. The first end tube 28 has an open end into which the one end of the center rod 27 is arranged. A nylon bush 30 is arranged at the open end, the nylon bush 30 being arranged around the center rod 27 and extending inwards into the first end tube 28 from the open end. A rubber bush 31 is arranged around the nylon bush 30, which rubber bush 31 extends inwards into the first end tube 28 from the open end and extends inwards into the first end tube 28 from the open end by the same or a lesser amount than the nylon bush 30. The retractable rail is designed mirror symmetrical about a plane that is arranged perpendicular to the longitudinal axis A as regards the design of a center rod 27 and the design of a first end tube 28 and a second end tube 29, but designed differently as regards the attachment of the first end tube 28 to the first gangway end 15 compared to the attachment of the second end tube 29 to the second gangway end 16.

The term "connected to the first gangway end" is understood to encompass the shown connection of the first rail end 6 to the first side panel 17 in an endzone 32 of the first side panel 17, the endzone 32 being smaller than a third of the width of the first side panel 17. The term "connected to the second gangway end" is understood to encompass the shown connection of the second rail end 7 to the second side panel 18 in an endzone 33 of the second side panel 18, the endzone 33 being smaller than a third of the width of the second side panel 18.

A central main panel 35 is provided between the first side panel 17 and the second side panel 18. The rail 5 is connected central main panel 35 by way of a joint 36.

Figure 11:
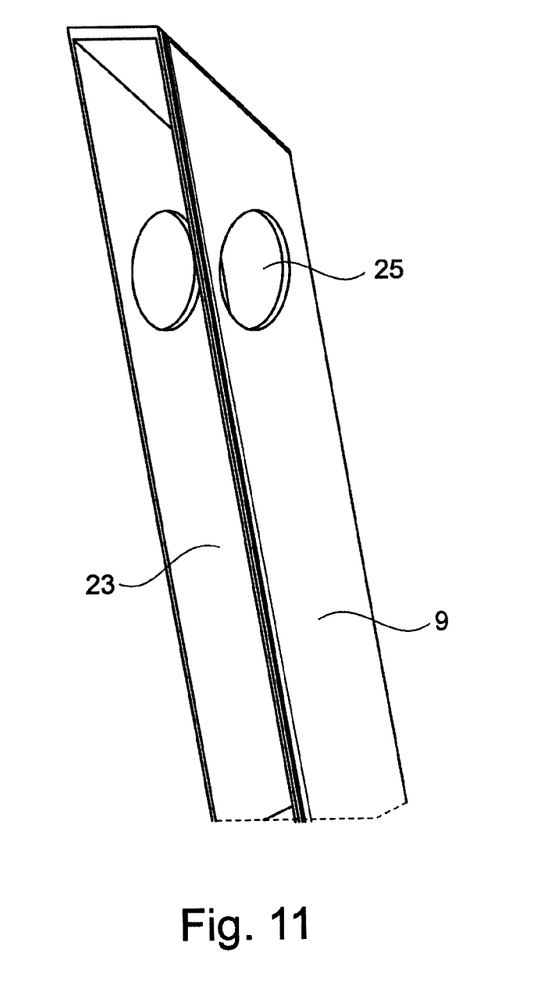
FIG. 11 a schematic perspective view onto a cover piece.

The cover is made up of a series of individual cover pieces 23,24. The cover pieces 23, 24 are block-shaped pieces. The cover pieces 23, 24 the same geometric shape and/or size. The cover pieces 23, 24 are connected to the rail 5 and extend from the rail 5 into a direction perpendicular to the longitudinal axis A. The cover pieces 23 are designed to be more flexible in that part that is further away from the rail 5 than that part of the respective cover piece that is attached to the rail 5. The difference in flexibility is achieved by differences in shape of the respective parts of the respective cover piece 23, namely by at least one hole 25 that by its rim and its cooperation with the rail 5 provides stiffness. The rail 5 passes through the hole 25.

In the series of individual cover pieces 23,24 at least a first sub-series of cover pieces 24 with a first elasticity and a further sub-series of cover pieces 23 with a second elasticity is provided. In a preferred embodiment within the series of individual cover pieces 23,24 a first sub-series of cover pieces 24 with a lower elasticity is provided closer to the first gangway end 15, a second sub-series of cover pieces 24 with the same elasticity than the elasticity of the cover pieces 24 of the first sub-series, is provided closer to the second gangway end 16, and a third sub-series of cover pieces 23 with a higher elasticity is provided, the cover pieces 23 of the third sub-series being arranged between the cover pieces 24 of the first sub-series and the cover pieces 24 of the second sub-series.

The difference in elasticity of the cover pieces 23 of the one sub-series relative to the cover pieces 24 of the other sub-series is achieved by having the cover-pieces 23 of the sub-series with the higher elasticity being at least partially hollow and the cover-pieces 24 of the sub-series with the lower elasticity being solid.

Figure 12:
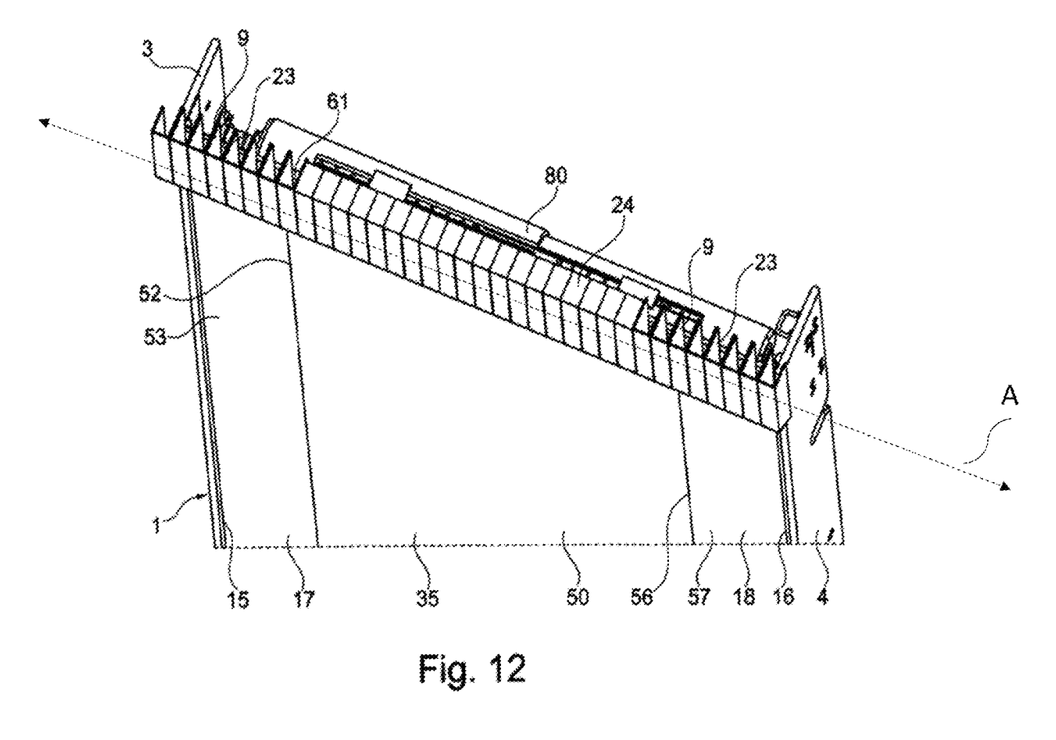
FIG. 12 a schematic perspective view onto the top of the sidewall.
Figure 13:
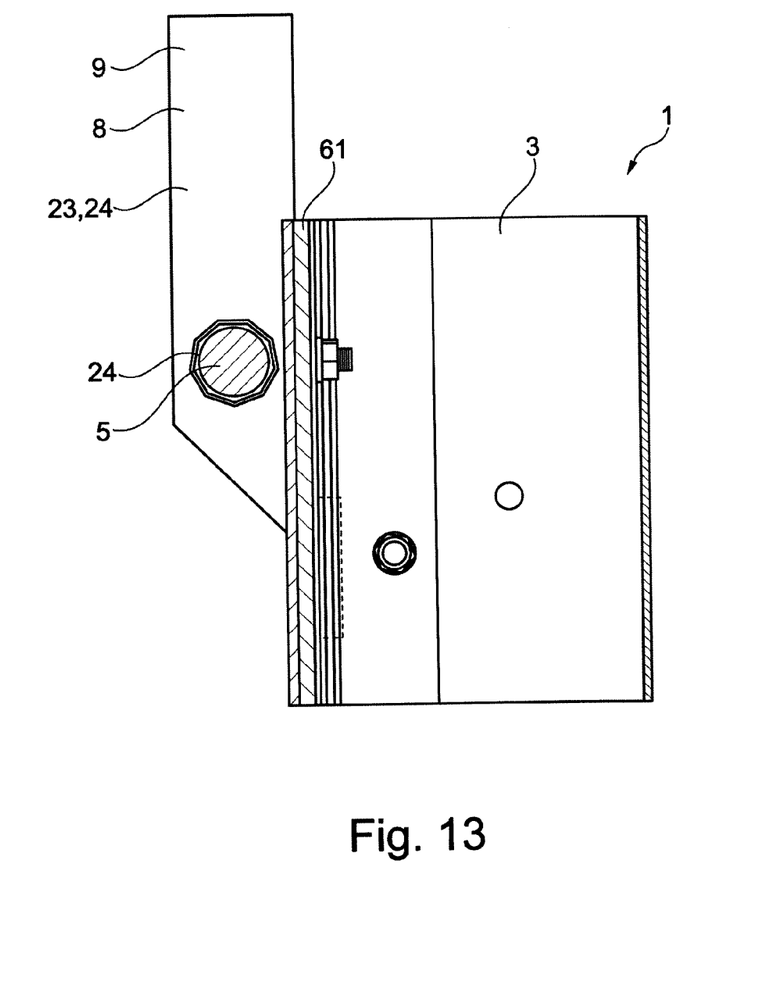
FIG. 13 a schematic sectional view through the top of the sidewall.

FIG. 12 shows the embodiment, where the opposite alternative is implemented, wherein the more flexible, hollow cover pieces 23 are arranged closer to the first gangway end 6 and the second gangway end 7 and the solid cover pieces 24 are arranged in the middle.

The cover pieces 23, 24 extend away from the rail into the direction perpendicular to the longitudinal axis by the same amount.

The flexible portion 9 contains a series of individual cover pieces 23, 24 that are arranged next to each other and that extend into a direction perpendicular to the longitudinal axis A.

Figure 10:
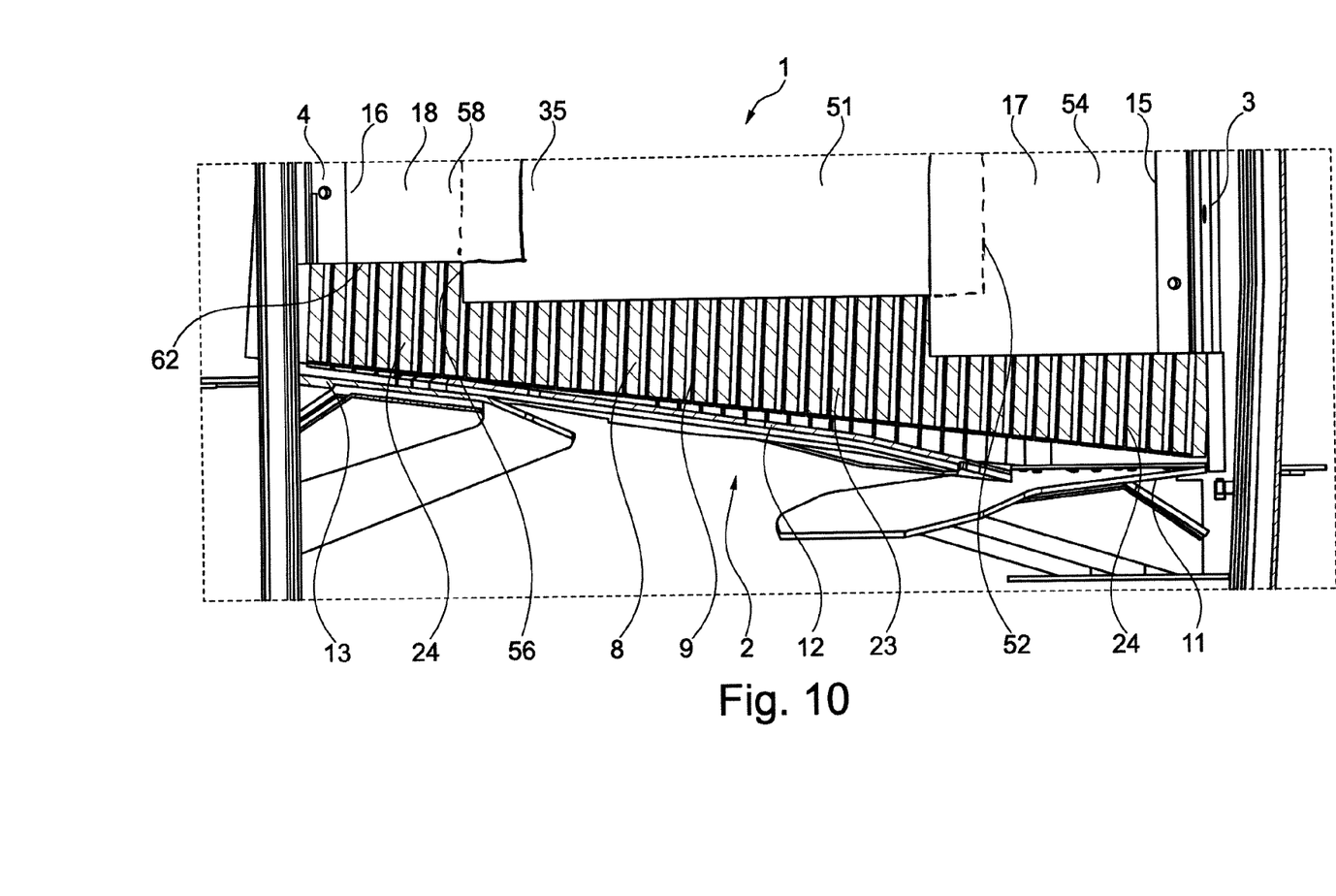
FIG. 10 a schematic side view onto a lower part of the sidewall and the floor of the gangway.

FIG. 10 shows a position of the gangway in a driving condition where the first vehicle mounting plate 3 is situated higher than the second vehicle mounting plate 4. As can be seen from FIG. 8, because the first rail end 6 is attached to the first side panel 17 and because the second rail end 7 is attached to the second side panel 18, the rail 5 and with the rail 5 the cover 8 takes up a slanted position.

FIG. 10 shows that in this particular embodiment of the gangway the floor 2 has a first tread plate 11 that is attached to the first vehicle mounting plate 3, a central plate 12 that is provided and a second tread plate 14 that is attached to the second vehicle mounting plate 4. The central plate 12 with one end rests on the end of the first tread plate 11 and with another end rests on the second tread plate 14.

As can be seen in FIG. 10 the driving condition that the gangway has taken up in FIG. 10 leads to the central plate 12 to take up a slanted position.

As can be seen in FIG. 10, because the cover 8 takes up a slanted position it has the ability to better cover a gap between the bottom end of the sidewall 1 and the parts of the floor 2.

It is understood that all presented embodiments are only exemplary, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category (method/apparatus/system) may also be used in a corresponding manner in an example embodiment of any other category. Those skilled in the art should appreciate that they may readily use the present disclosure as a basis for designing or modifying other processes and structures for carrying out the same purposes and/or achieving the same advantages of the embodiments introduced herein. Those in the art will recognize that other embodiments may be practiced with modifications and alterations limited only by the claims.

What is claimed is:

1. A sidewall suitable for a gangway, the sidewall comprising:
   a first gangway end;
   a second gangway end opposite the first gangway end;
   a retractable rail comprising a first rail end connected to the first gangway end, and a second rail end opposite the first rail end;
      wherein the second rail end is connected to the second gangway end, and wherein the retractable rail extends along a longitudinal axis (A);
   a cover attached to the rail and extending along the rail;
   wherein the cover comprises a flexible portion that extends from the rail into a direction perpendicular to the longitudinal axis (A).

2. The sidewall according to claim 1, wherein the retractable rail is a telescopic rod.

3. The sidewall according to claim 1, wherein
   the first rail end is connected to the first gangway end by way of a joint that enables swivel movement of the rail relative to the first gangway end.

4. The sidewall according to claim 1, wherein
   the second rail end is connected to the second gangway end by way of a joint that enables swivel movement of the rail relative to the second gangway end.

5. The sidewall according to claim 1, wherein
   the first rail end is connected to the first gangway end by way of a joint that enables swivel movement of the rail relative to the first gangway end;
   and
   the second rail end is connected to the second gangway end by way of a joint that enables swivel movement of the rail relative to the second gangway end.

6. The sidewall according to claim 1, wherein the sidewall further comprises:
   a first panel that provides the first gangway end; and
   a second panel that provides the second gangway end.

7. The sidewall according to claim 1, further comprising a center panel connected to the rail.

8. The sidewall according to claim 1, wherein the cover comprises a series of individual cover pieces.

9. The sidewall according to claim 8, wherein at least some of the individual cover pieces have at least one hole defined therein, and wherein the rail passes through the at least one hole.

10. The sidewall according to claim 8, wherein the series of individual cover pieces comprises at least a first sub-series of cover pieces with a first elasticity, and a second sub-series of cover pieces with a second elasticity.

11. A gangway comprising:
    a sidewall comprising:
       a first gangway end;
       a second gangway end opposite the first gangway end;

a retractable rail comprising a first rail end connected to the first gangway end, and a second rail end opposite the first rail end;
wherein the second rail end is connected to the second gangway end, and wherein the retractable rail extends along a longitudinal axis (A);
a cover attached to the rail and extending along the rail;
wherein the cover comprises a flexible portion that extends from the rail into a direction perpendicular to the longitudinal axis (A).

12. The gangway according to claim 11, wherein in a normal position of the gangway, a floor of the gangway takes up a predetermined position and the sidewall takes up a predetermined position, and a bottom edge of the sidewall in the normal position is arranged at a predetermined position relative to the floor such that a gap exists between the bottom edge and the floor, wherein in the normal position the rail is arranged above the bottom edge and the flexible portion of the cover extends towards the floor and at least partially covers the gap.

13. A multi-car vehicle comprising:
a first car having an end;
a second car having an end,
a gangway arranged between the first car and the second car;
wherein the gangway comprises:
a sidewall comprising
a first gangway end;
a second gangway end opposite the first gangway end;
a retractable rail comprising a first rail end connected to the first gangway end, and a second rail end opposite the first rail end;
wherein the second rail end is connected to the second gangway end, and
wherein the retractable rail extends along a longitudinal axis (A);
a cover attached to the rail and extending along the rail;
wherein the cover comprises a flexible portion that extends from the rail into a direction perpendicular to the longitudinal axis (A).

14. The multi-car vehicle of claim 13, wherein in a normal position of the gangway, a floor of the gangway takes up a predetermined position and the sidewall takes up a predetermined position, a bottom edge of the sidewall in the normal position is arranged at a predetermined position relative to the floor such that a gap exists between the bottom edge and the floor, wherein in the normal position the rail is arranged above the bottom edge, and the flexible portion of the cover extends towards the floor and at least partially covers the gap.

* * * * *